United States Patent [19]

Beck

[11] Patent Number: 4,780,257

[45] Date of Patent: Oct. 25, 1988

[54] ONE PIECE SELF-STANDING BLOW MOLDED PLASTIC BOTTLES

[75] Inventor: Martin H. Beck, Merrimack, N.H.

[73] Assignee: Devtech, Inc., Merrimack, N.H.

[21] Appl. No.: 55,647

[22] Filed: May 29, 1987

[51] Int. Cl.⁴ .............................................. B29C 49/12
[52] U.S. Cl. .................................... 264/40.1; 264/532; 264/537
[58] Field of Search ...................... 264/532, 40.1, 537, 264/542

[56] References Cited

U.S. PATENT DOCUMENTS

| | | |
|---|---|---|
| 3,031,095 | 4/1962 | Loughran . |
| 3,043,461 | 7/1962 | Glassco . |
| 3,137,748 | 6/1964 | Makowski . |
| 3,511,401 | 5/1970 | Lachner . |
| 3,598,270 | 8/1971 | Adomaitis et al. . |
| 3,643,829 | 2/1972 | Lachner . |
| 3,655,084 | 4/1972 | Wilhaus et al. . |
| 3,718,229 | 2/1973 | Wyeth et al. . |
| 3,720,339 | 3/1973 | Khetani . |
| 3,722,726 | 3/1973 | Carmichael et al. . |
| 3,757,978 | 9/1973 | Gilbert . |
| 3,759,410 | 9/1973 | Uhlig . |
| 3,811,588 | 5/1974 | Vermeerbergen et al. . |
| 3,870,181 | 3/1975 | Sincock . |
| 3,871,541 | 3/1975 | Adomaitis . |
| 3,881,621 | 5/1975 | Adomaitis . |
| 3,917,095 | 11/1975 | Seefluth . |
| 3,948,404 | 4/1976 | Collins et al. . |
| 4,024,975 | 5/1977 | Uhlig . |
| 4,108,324 | 8/1978 | Krishnakumar et al. . |
| 4,134,510 | 1/1979 | Chang . |
| 4,177,239 | 12/1979 | Gittner et a. . |
| 4,219,124 | 8/1980 | Amberg . |
| 4,241,839 | 12/1980 | Alberghini . |
| 4,247,012 | 1/1981 | Alberghini . |
| 4,249,667 | 2/1981 | Pocock et al. . |
| 4,254,882 | 3/1981 | Yoshino . |
| 4,256,231 | 3/1981 | Cioe et al. . |
| 4,261,948 | 4/1981 | Krishnakumer et al. . |
| 4,267,144 | 5/1981 | Collette et al. . |
| 4,287,150 | 9/1981 | Gendron . |
| 4,330,579 | 5/1982 | Ota et al. . |
| 4,334,627 | 6/1982 | Krishnakumar et al. . |
| 4,335,821 | 6/1982 | Collette et al. . |
| 4,359,165 | 11/1982 | Jakobsen . |
| 4,403,706 | 9/1983 | Mahajan . |
| 4,436,216 | 3/1984 | Chang . |
| 4,442,944 | 4/1984 | Yoshino et al. . |
| 4,467,929 | 8/1984 | Jakobsen et al. . |
| 4,502,607 | 3/1985 | Szajna . |
| 4,525,401 | 6/1985 | Pocock et al. . |
| 4,598,831 | 7/1986 | Nakamura et al. . |
| 4,615,667 | 10/1986 | Roy . |
| 4,615,928 | 10/1986 | Kawaguchi et al. . |

Primary Examiner—Jan H. Silbaugh
Assistant Examiner—Neil Michael McCarthy
Attorney, Agent, or Firm—Davis, Bujold & Streck

[57] ABSTRACT

A one-piece plastic bottle of the champagne base variety having an annular peripheral chime surrounding an inward sloping base portion for containing carbonated beverages and associated methods for making the bottle by blow molding. To make the bottle resist to inversion of the base from internal pressure, an integral reinforcing ring is incorporated into the base and runs horizontally in the hoop direction. The reinforcing ring is placed in a location within the base that has a moment arm trying to invert the base and providing sufficient strength to withstand that moment arm and prevent inversion of the inward sloping portion. A blow molding process for producing a one-piece plastic bottle by expanding an elongated hollow preform containing PET plastic material for the neck, body and base of the bottle into a mold, forming the preform with annular thickened portions positioned such that during blowing of the preform the material of the preform will be deposited as desired; positioning the preform within a blow molding cavity defining the finished bottle shape; and, injecting pressurized gas into the preform adjacent the neck whereby the preform is radially stretched outward to fill the cavity and form the bottle. In one embodiment, the method further includes the step of extending a stretch rod within the preform into the cavity towards the bottom thereof to longitudinally stretch the material of a foreshortened preform to fill the cavity from the top to adjacent the bottom thereof prior to the blowing step.

5 Claims, 7 Drawing Sheets

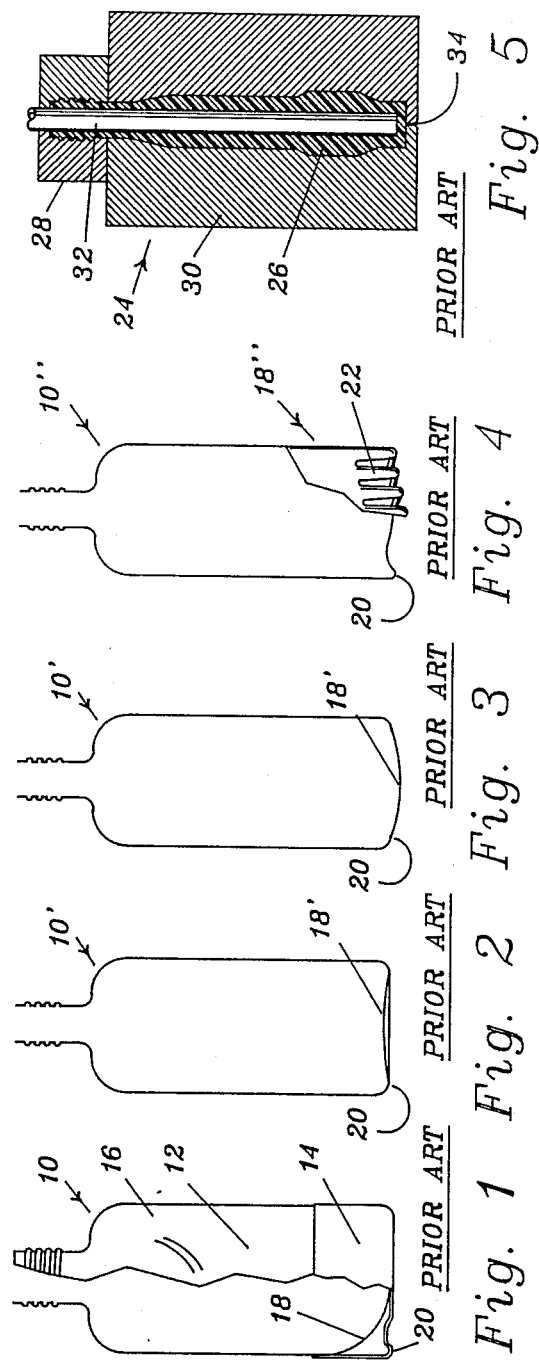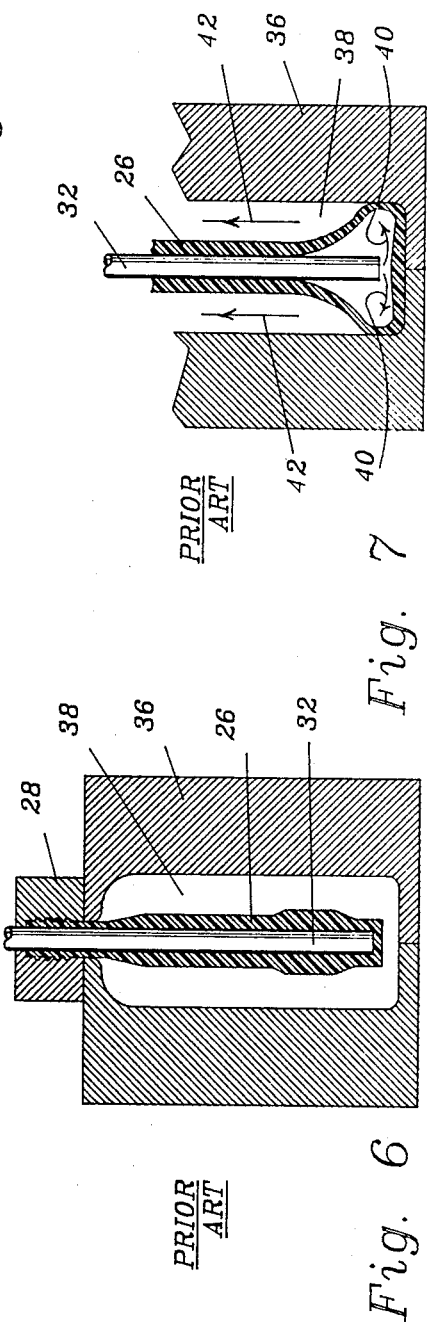

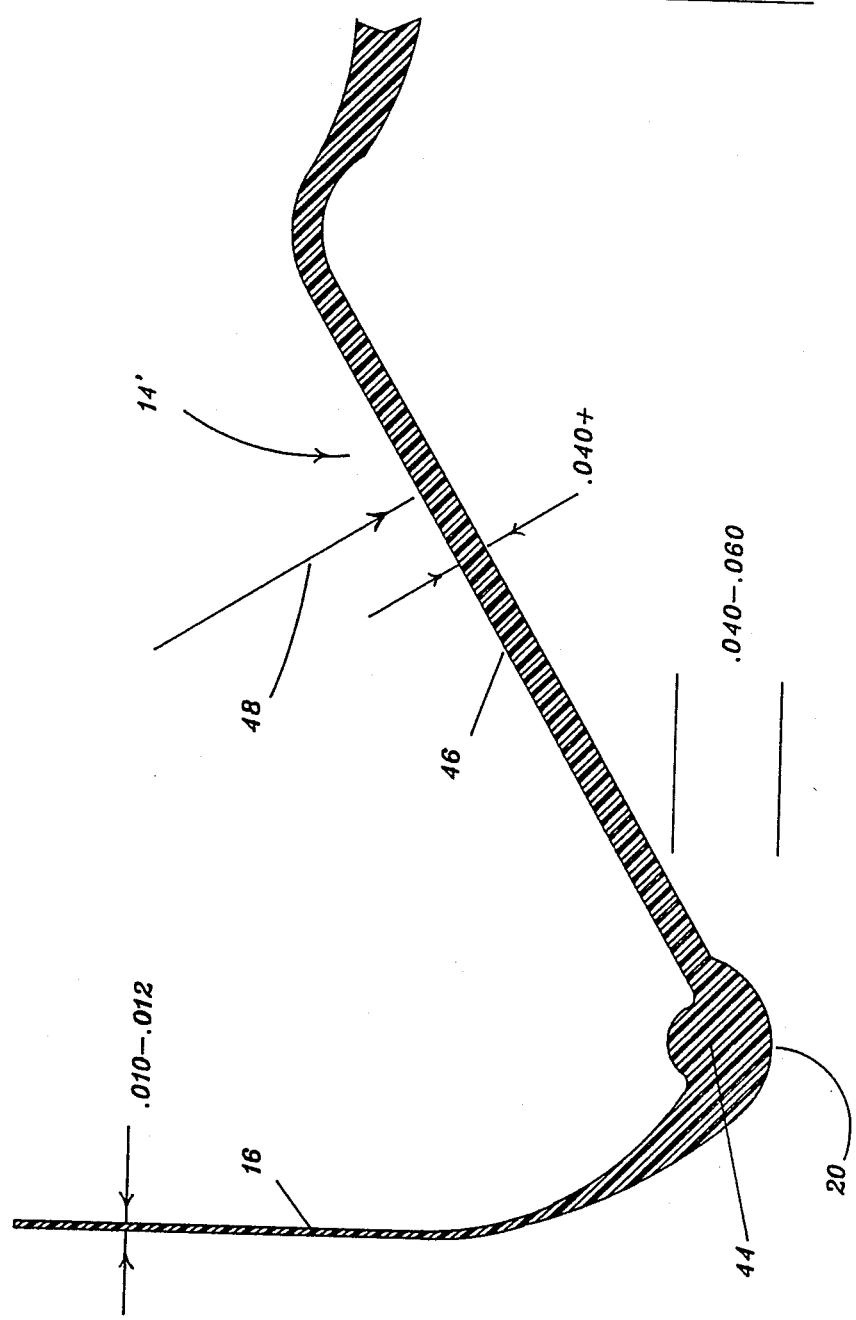

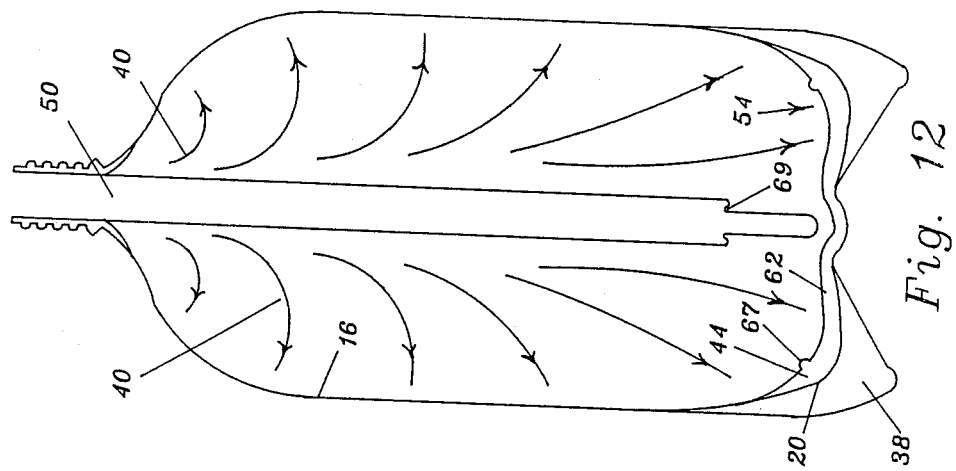
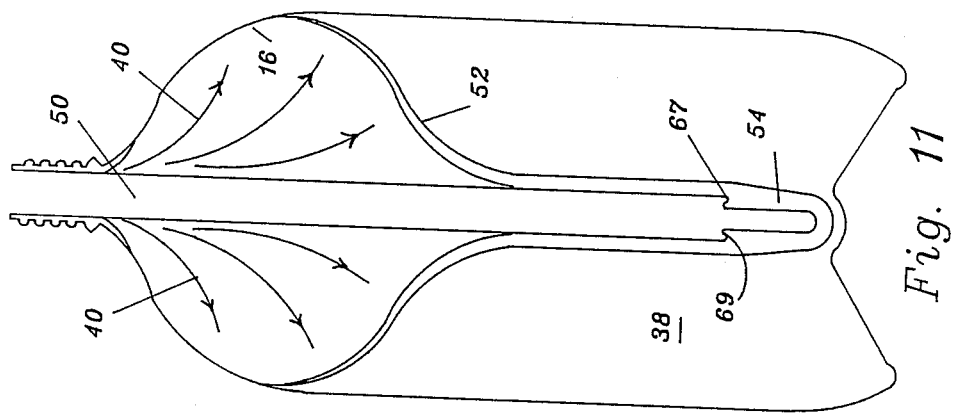
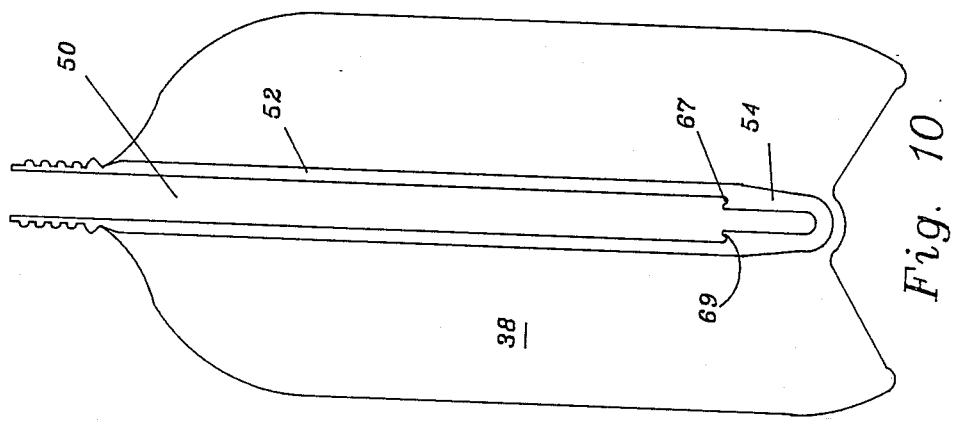

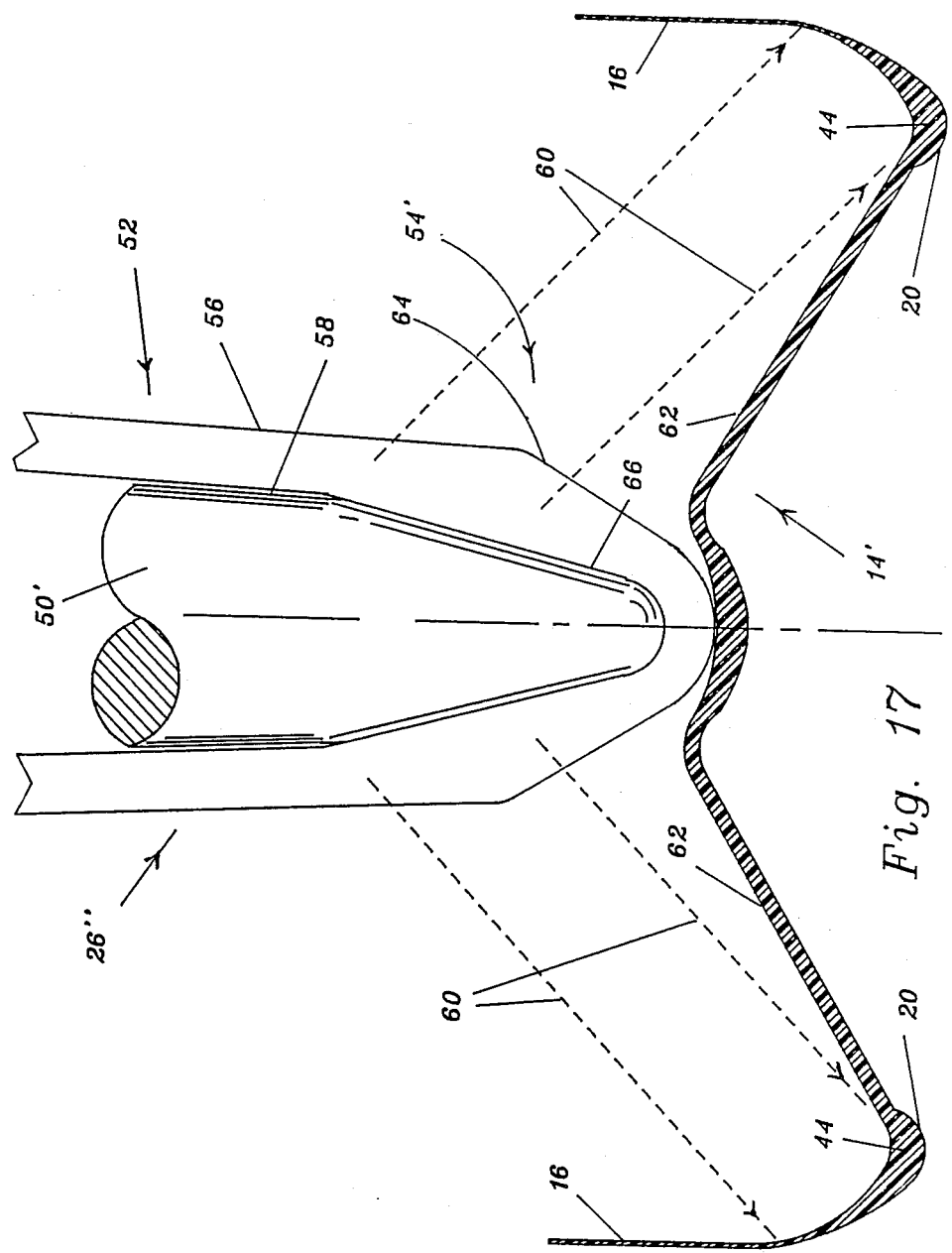

ONE PIECE SELF-STANDING BLOW MOLDED PLASTIC BOTTLES

BACKGROUND OF THE INVENTION

The present invention relates to plastic bottles and the methods of producing same and, more particularly, to a one-piece disposable (i.e. single service) plastic bottle of the champagne base variety having an annular peripheral chime surrounding an inward sloping base portion for containing carbonated beverages and the improvement for having the bottle resist inversion of the base from internal pressure comprising an integral reinforcing ring incorporated into the base and running horizontally in the hoop direction, the reinforcing ring being placed in a location within the base that has a moment arm trying to invert the base and providing sufficient strength to withstand that moment arm and keep the push up of the inward sloping portion intact and to the improvement to the method of a blow molding process for producing such a bottle by expanding an elongated preform containing the plastic material for the neck, body and base of the bottle into a mold comprising the steps of forming the preform with annular thickened portions of the preform positioned along the length such that during blowing of the preform the material of the preform will be deposited so that the t inward sloping base portion is of a thickness sufficient to resist self-deformation and create a moment arm thereof around the chime tending to unroll and radially stretch the chime and the chime has an integral reinforcing hoop formed therein for preventing unrolling nd radial stretching of the chime sufficient to allow inversion of the inward sloping base portion; positioning the preform within a blow molding cavity defining the finished bottle shape; and, injecting pressurized gas into the preform adjacent the neck whereby the preform is radially stretched outward to fill the cavity and form the bottle from the neck towards the base.

Blow molded plastic bottles have largely replaced the heavier glass bottles previously used for soft drinks, and the like. In a two liter bottle of plastic, the weight of the bottle itself is negligible as opposed to the weight of a glass bottle of similar capacity. The first plastic bottles were generally two piece bottles such as that indicated as 10 in FIG. 1. The bottle 10 comprises the pressure vessel portion 12 and a base 14 which permits the bottle 10 to stand upright on shelves, and the like. The pressure vessel portion 12 is typically of a tough, flexible plastic such as polyethelene terephthalate and has very thin sidewalls 16 which become resiliently rigid for gripping due to the internal pressure created by the carbon dioxide gas in the soft drink liquid contained therein. The bottom 18 is semi-spherical for the same pressure-containing reasons and, therefore, the separate base 14 is required in order to have the bottle 10 be able to stand by itself. The base 14 is typically of a plastic such as polyethylene and is attached over the bottom 18 of the pressure vessel portion 12 with adhesive.

Presently, approximately 75% of the beverage containers produced worldwide are of the above-described two-piece construction. Because of the inert and non-degradable nature of the plastics used in the plastic beverage bottles and their thin-walled construction, there has been much interest recently in having them recycled rather than deposited in landfills along with other trash. With the increased usage of such plastic bottles, their presence in large quantities in landfills presents a genuine compaction problem. Moreover, the cost of the polyethylene terephthalate plastic employed in such bottles makes recycling a practical alternative to disposal. The two piece bottles, such as bottle 10 of FIG. 1, on the other hand, create recycling problems. First, there are the two different kinds of plastics employed. There is no practical and cost effective way of simply and easily separating the pressure vessel portion 12 from the base 14 so that the two plastics can be processed separately. Also, there is the problem of the adhesive used to fasten the two parts together. The adhesive is a contaminant to any recycled plastic materials. Wherefore, there has been much effort spent in attempting to develop a practical one piece plastic bottle and method for its manufacture.

As shown in simplified form in FIG. 2, the obvious approach to a plastic bottle intended for the holding of carbonated beverages was one such as that indicated as 10' having a so-called "champagne" base or bottom 18' having a peripheral chime 20 upon which the bottle 10' sits surrounding an inward sloping portion which resists the internal pressure. The only problem with this approach using a unitary thickness plastic is that the bottom 18' quite often inverts, as depicted in FIG. 3, from the internal pressure. In an attempt to avoid that problem, numerous bottle configurations have been proposed incorporating integral pressure-resistant ribs, such as those indicated as 22 in FIG. 4, into the bottom 18" of the bottle 10" depicted therein. In this regard, typical prior art approaches to making pressure resistant plastic bottles can be seen with reference to the following U.S. Pat. Nos. 3,511,401 (Lachner); 3,598,270 (Adomaitis et al.); 3,643,820 (Lachner); 3,720,339 (Khetani); 3,881,621 (Adomaitis); 4,108,324 (Krishnakumar et al.); 4,134,510 (Chang); 4,334,627 (Krishnakumar et al.); 4,403,706 (Mahajan); 4,467,929 (Jakobsen et al.); 4,525,401 (Pocock et al.); 4,249,667 (Pocock et al.); 4,254,882 (Yoshino); and 4,261,948 (Krishnakumar et al.). As is well known to those skilled in the art, simpler is better when it comes to blow molding a bottle design and while the various rib patterns generally work in preventing bottom inversion, they create a multitude of problems with respect to a consistent and cost effective blow molding process for their production.

Another aspect of plastic bottle production by blow molding techniques which is known in the art is the use of varying wall thicknesses at critical points of stress, such as in the neck and capping threads. A good example of such a prior art approach and the apparatus employed therewith can be seen with reference to U.S. Pat. No. 3,137,748 to Makowski. FIGS. 5-7 hereof depict the process and apparatus of Makowski in simplified form. As shown in FIG. 5, a double two-part mold 24 is used to create a preform 26 of the plastic to be used for the bottle. The mold 24 has a neck-producing portion 28 and a bottle-producing portion 30. A hollow core pin 32 is inserted into the assembled mold 24 and the preform 26 made by injecting the plastic through a sprew hole at 34. The bottle-producing portion 30 of the mold 24 must be a two-part or split mold since the core pin 32 is cylindrical and the preform 26 contains areas of various thickness to provide additional material for various areas of the finished bottle.

As shown in FIG. 6, the preform 26 with the core pin 32 therein and the neck-producing portion 28 of the mold 24 in place is removed from the bottle-producing portion 30 following the injection molding procedure and mounted to a blow mold 36 having a bottle-defining cavity 38 therein. As known by those skilled in the art, various considerations relative to the temperature of the preform prior to the actual blow molding step must be accounted for. For purposes of the present discussion, however, they are of no real importance and, therefore, will not be considered. The core pin 32 of Makowski is hollow and contains an integral valve (not shown) at the bottom end thereof. With the preform 26 positioned within the cavity 38 as shown in FIG. 6, the valve is opened and pressurized air 40 injected causing the preform 26 to stretch outward from the bottom up, as indicated by the arrows 42, to fill the cavity 38 and thereby create the final bottle.

The Makowski patent is not directed to producing a pressure-resistant bottle. The variations in thickness of the preform 26 are to provide different amounts of material available for stretching to form various parts of the bottles shown therein which are of complex shape, such as those used for dishwashing liquids and the like. There is no need for the accurate placement of integral reinforcement-producing areas. Moreover, the preform design with respect to the cylindrical core pin 32 makes the use of a more costly and complex two-part or split injection mold for the production of the preform a necessity.

Wherefore, it is an object of the present invention to provide a construction for the bottom or base of a one piece plastic bottle for containing carbonated beverages which is of the champagne type but which resist inversion from internal forces without the necessity of including complex rib structures therein.

It is a further object of the present invention to provide a construction for the bottom or base of a one piece plastic bottle for containing carbonated beverages which is of the champagne type and formed by the blow molding of a preform wherein the preform is of a construction which can be produced in a simple one-part injection mold.

It is yet another object of the present invention to provide a method for the blow molding of one piece plastic bottle for containing carbonated beverages which has a bottom or base of the champagne type containing integral reinforcing sections accurately and repeatably positioned during the blow molding process.

Further objects and advantages of the present invention will become apparent from the description contained hereinafter in combination with the accompanying illustrative drawing figures.

SUMMARY

The foregoing objects have been accomplished in the present invention by the improvement to a single-serve, one-piece PET plastic bottle of the champagne base variety having an annular peripheral chime surrounding an inward sloping base portion for containing carbonated beverages comprising an integral reinforcing ring incorporated into the base and running horizontally in the hoop direction, the reinforcing ring being placed in a location within the base that has a moment arm trying to invert the base and providing sufficient strength to withstand that moment arm and keep the push up of the inward sloping portion intact.

An associated improvement of the present invention for accomplishing the objects thereof is directed to a method to be employed in a blow molding process for producing a onepiece plastic bottle by expanding an elongated PET plastic preform containing the material for the neck body and base of the bottle into a mold comprising the steps of forming the hollow preform with annular thickened portions of the preform positioned along the length thereof adjacent the bottom-forming portion thereof such that during blowing of the preform the material of the preform will be deposited so that the inward sloping base portion is of a thickness sufficient to resist self-deformation and create a moment arm thereof around the chime tending to unroll and radially stretch the chime and the chime has an integral reinforcing hoop formed therein for preventing unrolling and radial stretching of the chime sufficient to allow inversion of the inward sloping base portion; positioning the preform within a blow molding cavity defining the finished bottle shape; and, injecting pressurized gas into the preform adjacent the neck whereby the preform is radially stretched outward to fill the cavity and form the bottle from the neck towards the base.

In the preferred embodiment, the preform is foreshortened from the neck to the base with respect to the corresponding distance in the finished bottle and the method includes the additional step prior to blowing of extending a stretch rod in the preform into the cavity towards the bottom thereof to longitudinally stretch the material of the preform to fill the cavity from the top to adjacent the bottom thereof. In the preferred embodiment, the stretch rod contacts an interior annular nub on the preform adjacent the base-forming portion thereof so that virtually all the stretching of the preform takes place in the sidewall-producing portion thereof

DESCRIPTION OF THE DRAWINGS

FIG. 1 is a simplified partially cutaway drawing of a prior art two piece plastic bottle.

FIG. 2 is a simplified cutaway drawing of a prior art one piece plastic bottle having a so-called champagne base.

FIG. 3 is a simplified cutaway drawing of the prior art one piece plastic bottle of FIG. 2 showing how the thin champagne base inverts due to the internal pressure created by carbon dioxide gas in carbonated beverages, and the like.

FIG. 4 is a simplified partially cutaway drawing of a prior art one piece plastic bottle having strengthening ribs formed into the standing base portion.

FIG. 5 is a simplified partially cutaway drawing showing a prior art method and apparatus for making a preform used in blow molding a one piece plastic bottle.

FIG. 6 is a simplified partially cutaway drawing showing the prior art method and apparatus for using the preform of FIG. 5 in blow molding a one piece plastic bottle.

FIG. 7 is a simplified partially cutaway drawing showing the prior art method and apparatus of FIGS. 5 and 6 in the process of blow molding a one piece plastic bottle from the bottom up.

FIG. 8 is an enlarged cutaway drawing of one-half the base portion of a one piece plastic bottle according to the present invention.

FIGS. 10-12 are simplified partially cutaway drawings showing the method and apparatus for forming a one-piece plastic bottle according to a first embodiment of the present invention.

FIG. 17 is an enlarged partially cutaway drawing showing the base portion of a one piece plastic bottle according to the present invention in an alternate embodiment along with the preform structure which produces it and indicating the manner in which the portions of the preform move to form the self-rigidizing, inversion resistant, champagne base of the present invention.

DESCRIPTION OF THE PREFERRED EMBODIMENT

Figure 9:
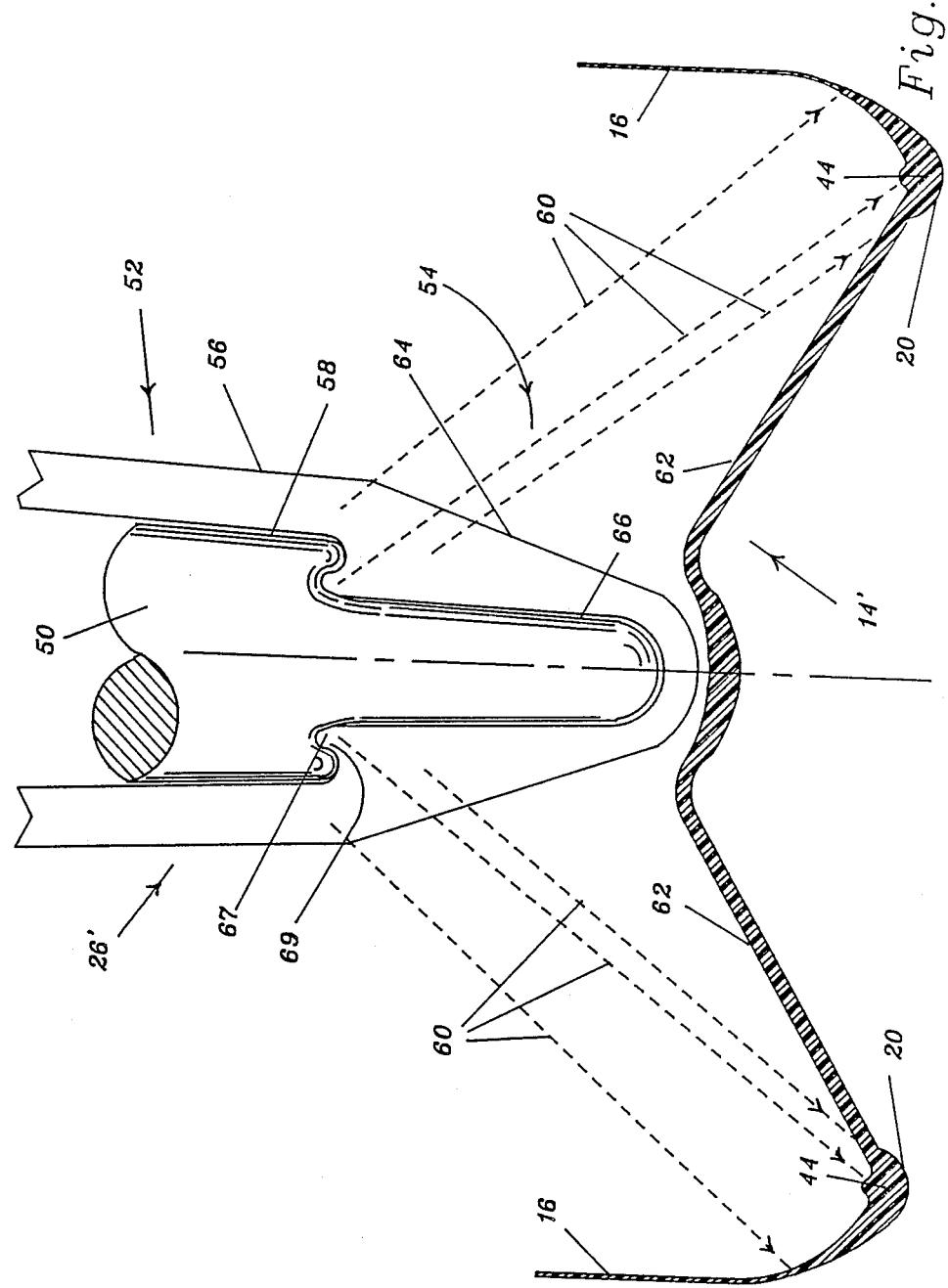
FIG. 9 is an enlarged partially cutaway drawing showing the base portion of a one piece plastic bottle according to the present invention as in FIG. 8 along with the preform structure which produces it and indicating the manner in which the portions of the preform move to form the self-rigidizing, inversion resistant, champagne base of the present invention.

The present invention is directed to a free-standing, one piece plastic bottle, preferably of PET (polyethylene terephthalate), for carbonated beverages having a champagne bottle type shaped base of controlled thickness to provide an annular chime to provide stable upright standing ability wherein the thickness of the bottom is controlled to provide adequate resistance to internal pressure, that thickness being derived from a varying thickness in the preform. More particularly, the base of the present invention incorporates an integral reinforcing ring that runs horizontally in the hoop direction. The reinforcing ring is placed in a location within the base of the bottle that has a moment arm trying to invert the base and provides sufficient strength to withstand that moment arm and keep the push up of the bottom intact. A principle feature is that the shape of the preform's interior and exterior walls are ever decreasing in diameter from the neck to the base so that it may be easily removed from a suitable core and injection mold cavity thereby avoiding the need for a split mold as in the Makowski teaching.

The stability of the chime radius is critical to the thermal performance of pressurized containers. Any movement of the chime due to the downward pressure exerted by the product pressure on the base (referred to as "creep") at ambient or elevated temperatures typically results in excessive container lean (perpendicularly), height increase, and fill level drop. The resistance to movement of the contact radius (chime) at a given temperature and pressure is a function of the chime radius itself, the wall thickness at the chime, and the total base contact diameter (which defines total base force at a given product pressure). In prior art one-piece bottles such as that shown in FIGS. 2 and 3 produced by blow molding, due to the combined axial/hoop preform wall reduction during stretch blow molding, the chime thickness of the base is typically only 15-20% of the original preform wall and as such, inadequate for thermal/pressure stability except when the chime radius is very sharp and/or the contact diameter is small. The sharp chime radius results in lower impact performance and susceptibility to environmental stress crack failure. In addition, there are limits to the radius that can be formed with plastic, specifically PET. The small contact diameter limits use of this basic base type to carbonated beverage applications (four volumes or more) up to 350 ml (i.e. 10-12 oz.).

Base construction for a bottle according to the present invention is shown in detailed cross-section in FIG. 8. As can be seen therein, the sidewalls 16 are of typical construction and thickness. Moreover, the shape of the base is also typical, meaning that the basic blow molds therefor can be retained. The outside radius of the chime 20 is also substantially the same as usual. As can be appreciated from the cross-sectional view of FIG. 8, however, the thickness of the chime 20 is such as to create an internal/integral reinforcing hoop 44 connected to a thickened base portion 46 extending between the reinforcing hoop 44 and the center of the base 14'. Pressure, as indicated by the arrow 48, pushes on the thickened base portion 46 which, because of its increased thickness, resists self-deformation and acts as a moment arm on the chime 20 trying to unroll it and stretch it radially outward in order to allow the base 14' to invert. Because of the integral reinforcing hoop 44, however, the chime 20 resist both the tendency to unroll and stretch radially outward. As a result, inversion is prevented.

While the above-described novel base construction of the present invention meets its objective of preventing base inversion from internal pressure in a simple and uncomplex manner, achieving the total objective of the present invention necessitates a corresponding cost effective method and apparatus for commercially producing bottles incorporating that base. Those methods and apparatus according to the present invention in preferred and alternate embodiments will now be described in detail.

To achieve accurate and repeatable placement of reinforcement quantities of plastic from a preform during blow molding and use of a simplified preform molding process as part thereof, the present invention deviates from the teachings of Makowski in several major ways. First, the preform and core rod employed in the present invention are such that the shape of the preform's interior and exterior walls are ever decreasing in diameter from the neck to the base so that it may be easily removed from the core and the injection mold cavity, thereby avoiding the need for a split mold. Second, when blowing the preform, it is done from the top down rather than the bottom up. Finally, in the preferred embodiment, the preform is axially stretched in the sidewall-producing area prior to blowing so as to assure less distortion and more accurate placement of the baseproducing portion thereof.

FIG. 9 shows in detail one embodiment of a stretch rod 50 inserted into a preform 26' as employed in the present invention. While the form of the single piece injection mold and associated core rod which can be employed to product the preform 26' is not shown, those skilled in the art will readily recognize the requirements thereof from the shape of the preform 26' itself. The preform 26' is composed of two parts—a sidewall-producing portion, generally indicated as 52, and a base-producing portion, generally indicated as 54. The sidewall-producing portion 52 is of substantially constant thickness so as to produce the constant thickness sidewalls 16 of the finished bottle. To achieve this with the ability to be removed from a single piece mold, the exterior surface 56 of the preform 26' in the sidewall-producing portion 52 tapers inward slightly from the top to the bottom as does the exterior surface 58 of the core rod used to produce it (not shown) in the same area. As indicated by the dashed arrows 60, the base-producing portion 54 of the preform 26' includes thickened area 62 which ultimately forms the reinforcing hoop 44. Again, to achieve this with the ability to be removed from a single piece mold, in one possible embodiment, the exterior surface 64 of the preform 26' in the base-producing portion 54 tapers inward more radically from the top to the bottom while the exterior surface 66 of the core rod use to produce it (not shown) in the same area tapers only slightly while being of significantly smaller diameter. Finally, at the point where the sidewall-producing portion 52 meets the base-producing portion 54, the preform 26' contains an annular nub 67 which is engaged by a matching annular groove 69 in the end of the stretch rod 50. The purpose thereof will be described in detail shortly. For the present, those skilled in the art will appreciate that the shape and placement of the annular nub 67 is such as to allow it to be produced in a one piece mold. In order to be inserted into the preform 26' following the molding thereof, except at the point of the nub 67, the outside diameter of the stretch rod 50 at each point along the length thereof must be slightly less than the inside diameter of the preform 26' at the corresponding point and, therefore, there is a slight gap between the two in most places except at the point of contact with the nub 67.

Turning now to FIGS. 10-12, the method of the present invention will be described with respect to a basic, but not preferred, embodiment thereof. As shown in FIG. 10, the preform 26' is positioned within a bottle-defining cavity 38 of a blow mold such as previously described with respect to FIGS. 5-7. For simplicity, the neck-producing portion 28 (which remains substantially the same) and the mold itself are not shown. In this embodiment, the bottom of the preform 26' is initially placed close to but not in contact with the bottom of the cavity 38. As mentioned earlier, appropriate heating of the preform 26' to blow molding temperatures in a manner well known to those skilled in the blow molding art for the materials employed will have been accomplished at this point. Spacing the bottom of the preform 26' from the bottom of the cavity 38 provides room for the preform 26' to move longitudinally to disengage the nub 67 from the groove 69 so that the base-producing portion 54 can then move properly to its desired final position As shown in FIGS. 11 and 12, pressurized air 40 is then injected between the stretch rod 50 and the preform 26' at the top causing the preform 26' to separate from the core rod 50, stretch, and form the sidewalls 16 of the bottle from the top down. In the base-producing portion 54, very little radial stretching takes place as that portion, which is positioned last, lays over to form the base 14' including the reinforcing hoop 44 within the chime 20 as desired.

Figure 15:
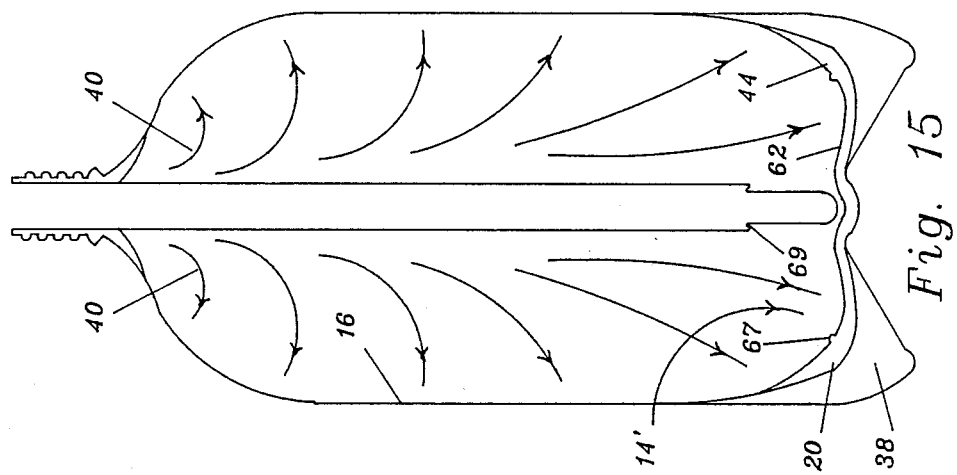
FIGS. 13-15 are simplified partially cutaway drawings showing the method and apparatus for forming a one-piece plastic bottle according to a second embodiment of the present invention.
Figure 14:
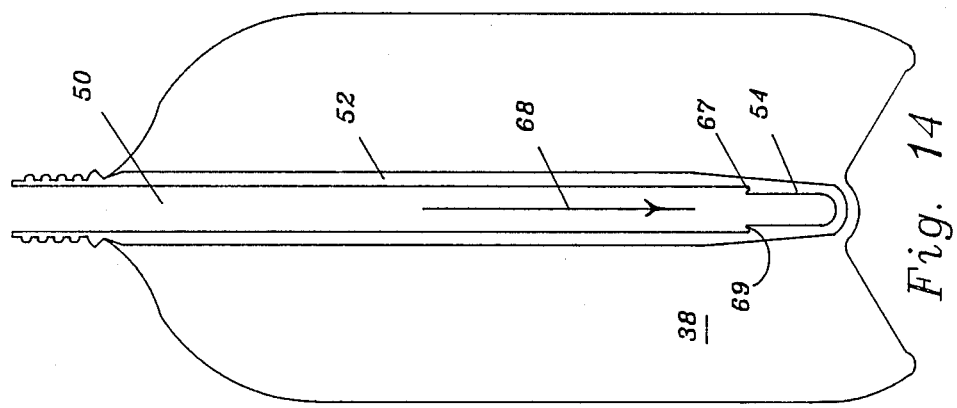
Figure 13:
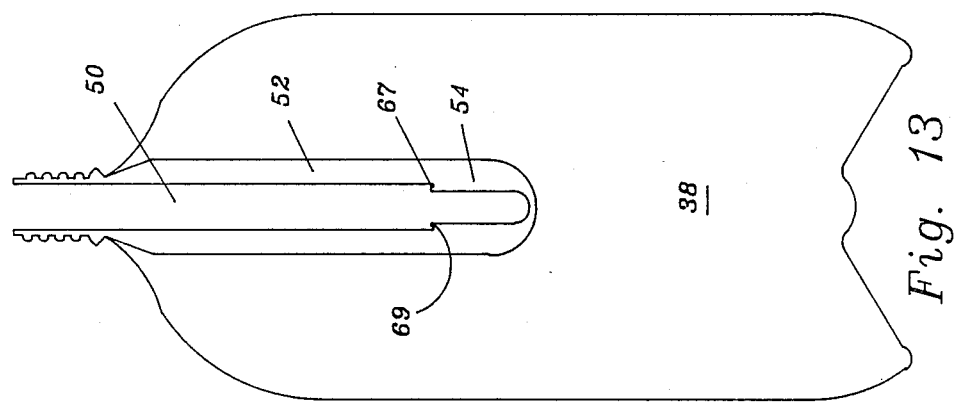

A second, and preferred, approach is shown in Figures 13-15. A second embodiment of the preform 26' is also shown therein wherein the base-producing portion 54 has an exterior surface 58 which is an extension of the exterior surface 56 above it and terminates in a rounded tip. In the method and apparatus depicted in FIGS. 13-15, the preform 26' is foreshortened in length as it comes from its mold. It is initially placed within the bottle-defining cavity 38 as in the previous embodiment. The stretch rod 50, however, is extendable and, as depicted in FIG. 14, it is then pushed downward as indicated by the arrow 68 until the bottom of the preform 26' is positioned close adjacent (but spaced from) the bottom of the cavity 38 as in FIG. 10 of the previous embodiment. During this step, the sidewall-producing portion 52 of the preform 26' is stretched longitudinally. Because the nub 67 is engaged by the groove 69 and there is a gap between the preform 26' and the stretch rod 50 elsewhere, however, the stretching forces are generally applied at the point of the nub 67 and groove 69 and virtually all the stretching takes place in the sidewall-producing portion 52 and the base-producing portion 54 is minimally stretched, if at all (i.e. 0–2x), and remains relatively undistorted. As is well known by those skilled in the art, preferred performance is obtained in the bi-axial blow molding of PET containers with proper longitudinal and axial stretching of the material during the molding process. The above-described physical stretching process performs two functions. For one, it provides a constant and uniform longitudinal stretching of the PET plastic in the sidewall-producing portion 52 with attendant ultimate performance benefits. For another, it assures that radial stretching of the sidewall-producing portion 52 is accurate, resulting in the subsequent very accurate placement of the base-producing portion 54 to form the thickened portion 46 and the reinforcing hoop 44 within the chime 20, as desired.

A beneficial side effect of the nub 67 in the method of either FIGS. 10-12 or 13-15 is its ability to indicate proper placement of the base-producing portion. Since the PET plastic is transparent and a portion of the nub 67 remains distinctly apparent on the inner surface of the chime 20, the radial position of the nub 67 following the blow molding process is visible from outside the final bottle. Its radial position can be used in the quality assurance process to determine if the base-producing portion is properly placed, or radially too far in or too far out. By adjusting the process parameters and checking the results by means of the position of the nub 67 in the final product, accurate placement of the hoop 44 within the chime 20 can be repeatably achieved.

As another beneficial side effect of the nub 67, as can be seen in FIG. 9, for example, the nub has an annular air gap between itself and the main body of the preform 26'. This air gap is useful and beneficial in minimizing the heat which is directed at the preform 26' in a reheat process which might be employed in a conventional manner as part of the process by those skilled in the art. The resultant relative colder portion of the preform 26' will then have less tendency to stretch, thus maximizing the material thickness in the chime 20.

Figure 16:
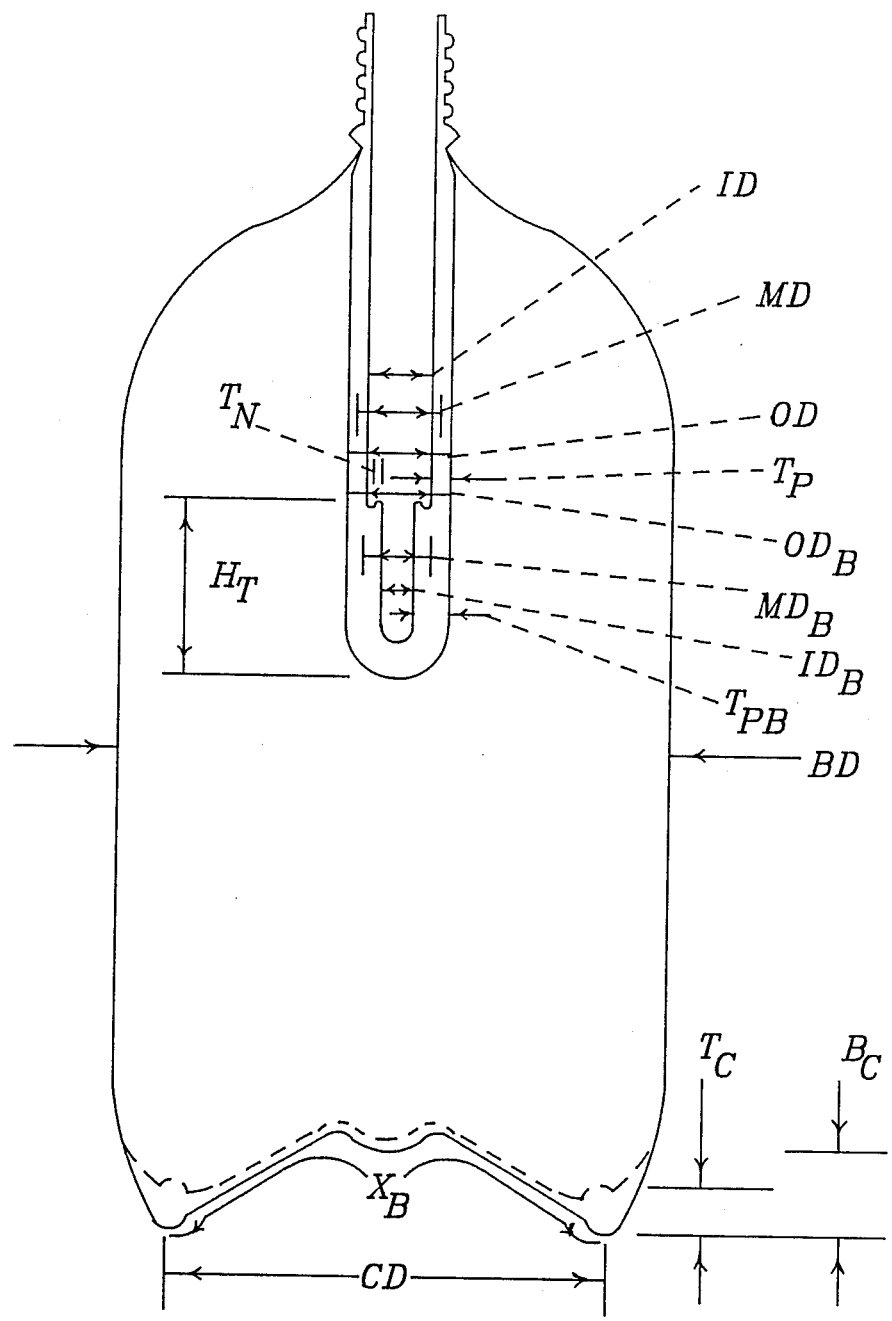
FIG. 16 is a cutaway drawing of the preform and finished bottle of the present invention showing the relative size relationships employed in a ½ liter bottle as manufactured by the assignee of this application according to the teachings herein.

By way of example with respect to the present invention, the size relationships employed to successfully produce a one piece one-half liter plastic bottle according to the present invention are depicted in FIG. 16 and are as follows:

$X_B = (1.10 - 1.6)CD$ $CD = (40 - 80\%)BD$ $T_{PB} = (OD_B - ID_B)/2$ $MD_B = (OD_B + ID_B)/2$ $$T_C = \frac{MD_B}{X_B}(T_{PB}) + T_N$$

$T_C = 1$ mm (minimum)

$B_C = (15 - 40\%)CD$ $$T_N = (0.01-0.60)(T_{PB}-T_P)$$

$$H_T = (0.3-0.7)X_B$$

where:
- $X_B$ = Base Traverse Distance
- $CD$ = Chime Diameter
- $T_{PB}$ = *Thickness of Preform Base*
- $MD_B$ = Median Diameter of Preform Base
- $T_C$ = Chime Thickness
- $B_C$ = Clearance of Base Center to Chime Bottom
- $MD$ = Median Diameter of Preform
- $T_P$ = Preform Top Thickness
- $T_N$ = Nub Thickness
- $H_T$ = Height to Top of Nub An alternate embodiment of the present invention not employing the nub 67 of the previously described embodiments is depicted in FIG. 17. While not preferred because of the lesser control over the placement of the thickened chime material, this embodiment is still an improvement over the prior art. It can be accomplished with stretching as in the embodiment of FIG. 13-14 or without as in the embodiment of FIG. 10-12. In this embodiment, the stretch rod 50' contacts the inner end of the preform 26" to spread the forces equally across the entire portion for equal stretching to occur within the preform 26". Additionally, the bottom of the preform 26" is initially placed against the bottom of the mold (i.e. there is no spacing therefrom as in the previously described embodiments). Because there is no interlocking of the nub and groove as in the previous embodiments, longitudinal travel to affect unlocking there of prior to radial stretching is unnecessary. Moreover, as can be seen from the figure, more material has been added to the outside of the base-forming portion 54' of the preform 26" to, in combination with the contacting relationship of the preform 26" to the mold, decrease travel of the material in the mold, which is desirable as it improves the inherent placement accuracy; that is, the more the stretching required and the further the materials have to travel, the less accurate the final placement thereof—the most accurate, of course, being a simple fold over with no stretching or distortion.

Thus, it can be seen from the foregoing description that the present invention has provided many facets to achieve its various objectives including a novel base design, a novel construction for a preform employed to produce the base by blow molding methods, and a novel method of blow molding a bottle to achieve accurate placement of portions of the preform employed therein into the final product which includes versions providing a self-generating indicator giving the ability to visually perform quality assurance on the final product to assure such placement.

Wherefore, having thus described my invention, I claim:

1. In a blow molding process for producing a one-piece plastic container by expanding an elongated preform containing the plastic material for the neck, body and base of the container into a blow mold cavity, the method for forming the container of the champagne base variety having an annular peripheral chime surrounding an inwardly sloping base portion wherein the container is resistant to inversion of the base from internal pressure comprising the steps of:

(a) forming a preform on a core rod in an injection mold cavity, the preform having an axial length less than the distance from the top to the bottom of the blow mold cavity and having a body-forming portion of constant thickness material along the length thereof for forming constant thickness sidewalls of the container and having a thicker base-forming portion such that during blowing of the preform, the material of the base-forming portion is blown to form the inwardly sloping base portion of a thickness sufficient to resist self-deformation and to form the annular peripheral chime having a moment arm therearound tending to create an integral reinforcing hoop within the chime sufficient for preventing inversion of the inwardly sloping base portion by preventing unrolling and radial stretching of the chime;

(b) forming an annular contacting surface on the inner surface of the preform which contacting surface extends between the body-forming portion and the thicker base-forming portion of the preform;

(c) positioning the preform within the blow mold cavity defining the finished container shape;

(d) inserting a stretch rod having a shoulder portion into the preform and contacting the shoulder portion of the stretch rod with the annular contacting surface of the preform;

(e) extending the stretch rod within the preform to move the bottom of the preform toward the bottom of the blow mold cavity to longitudinally stretch the material of the sidewall portion of the preform while minimizing stretching of the base-forming portion such that the preform extends from the top to adjacent the bottom of the blow mold cavity; and, (f) injecting pressurized gas into the preform adjacent the neck of the preform whereby the preform is radially stretched outwardly to fill the blow mold cavity and to form the container.

2. In a blow molding process for producing a one-piece plastic container by expanding an elongated preform containing the plastic material for the neck, body and base of the container into a blow mold cavity, the method for forming a container of the champagne base variety having an annular peripheral chime surrounding an inwardly sloping base portion wherein the container is resistant to inversion of the base from internal pressure comprising the steps of:

(a) forming a preform on a core rod in an injection mold cavity, the preform having an axial length less than the distance from the top to the bottom of the blow mold cavity and having a body-forming portion of constant thickness material along the length thereof for forming constant thickness sidewalls of the container and having a thicker base-forming portion such that during blowing of the preform, the material of the base-forming portion is blown to form the inwardly sloping base portion of a thickness sufficient to resist self-deformation and to form the annular peripheral chime having a moment arm therearound tending to create an integral reinforcing hoop within the chime sufficient for preventing inversion of the inwardly sloping base portion by preventing unrolling and radial stretching of the chime;

(b) forming an annular nub on the inner surface of the preform where the sidewall-forming and base-forming portions meet;

(c) positioning the preform within the blow mold cavity defining the finished container shape;

(d) inserting a stretch rod into the preform to contact the numb;

(e) extending the stretch rod within the preform to move the bottom of the preform toward the bottom of the blow mold cavity to longitudinally stretch the material of the sidewall portion of the preform while minimizing stretching of the base forming portion such that the preform extends from the top to adjacent the bottom of the blow mold cavity; and, (f) injecting pressurized gas into the preform adjacent the neck of the preform whereby the preform is radially stretched outwardly to fill the blow mold cavity and to form the container.

3. In the blow molding process of claim 1, forming interior and exterior surfaces of the preform which taper inwardly from the neck to the base of the preform so that the preform may be easily removed from the core rod and the injection mold cavity thereby avoiding a need to use a split mold to form the preform.

4. In the blow molding process of claim 2, forming interior and exterior surfaces of the preform which taper inwardly from the neck to the base of the preform so that the preform may be easily removed from the core rod and the injection mold cavity thereby avoiding a need to use a split mold to form the preform.

5. In the blow molding process of claim 2, additionally including the steps for controlling the radial placement of the material of the base-forming portion comprising:

(a) inspecting the radial placement of the nub on the inner surface of the chime of the blown container; and, (b) adjusting blow molding parameters as necessary to achieve desired radial placement of the nub to correspond with desired radial placement of the material of the chime thereunder

* * * * *